(12) United States Patent
Sun

(10) Patent No.: US 8,734,102 B2
(45) Date of Patent: May 27, 2014

(54) HEAT DISSIPATION DEVICE

(75) Inventor: Zheng-Heng Sun, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 485 days.

(21) Appl. No.: 13/086,412

(22) Filed: Apr. 14, 2011

(65) Prior Publication Data

US 2012/0247726 A1 Oct. 4, 2012

(30) Foreign Application Priority Data

Mar. 31, 2011 (CN) .......................... 2011 1 0080353

(51) Int. Cl.
F04D 29/64 (2006.01)

(52) U.S. Cl.
USPC ...................................... 415/213.1

(58) Field of Classification Search
USPC ................... 415/123, 130, 120, 213.1, 214.1; 361/695
See application file for complete search history.

(56) References Cited

U.S. PATENT DOCUMENTS

2003/0035724 A1* 2/2003 Chen et al. ................. 415/213.1

* cited by examiner

*Primary Examiner* — Dwayne J White
(74) *Attorney, Agent, or Firm* — Novak Druce Connolly Bove + Quigg LLP

(57) ABSTRACT

A heat dissipation device includes a number of fans and a fixing member. Each fan includes two spaced boards respectively defining a number of through holes. The fixing member is sandwiched between the boards of each fan, at a corner of the fan. The fixing member includes two engaging portions movably relative to each other. A number of pins are formed on each engaging portion for respectively engaging in the through holes of the fans.

17 Claims, 5 Drawing Sheets

HEAT DISSIPATION DEVICE

BACKGROUND

1. Technical Field

The present disclosure relates to a heat dissipation device.

2. Description of Related Art

Racks used for fixing fans in computers usually only accommodate fans of a particular size, which is inconvenient.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
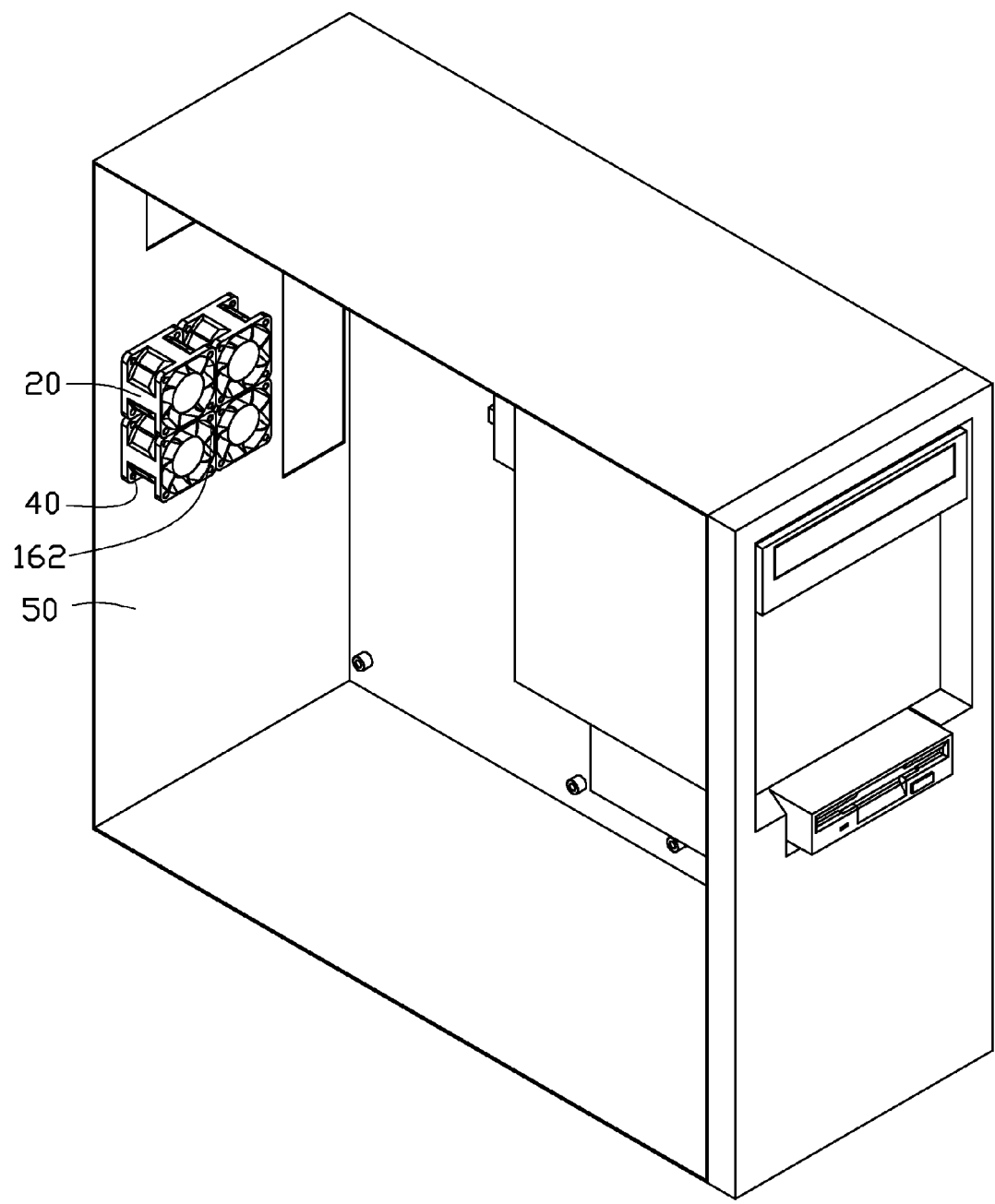
FIG. 1 is an assembled, isometric view of an exemplary embodiment of a heat dissipation device mounted in a chassis.
Figure 2:
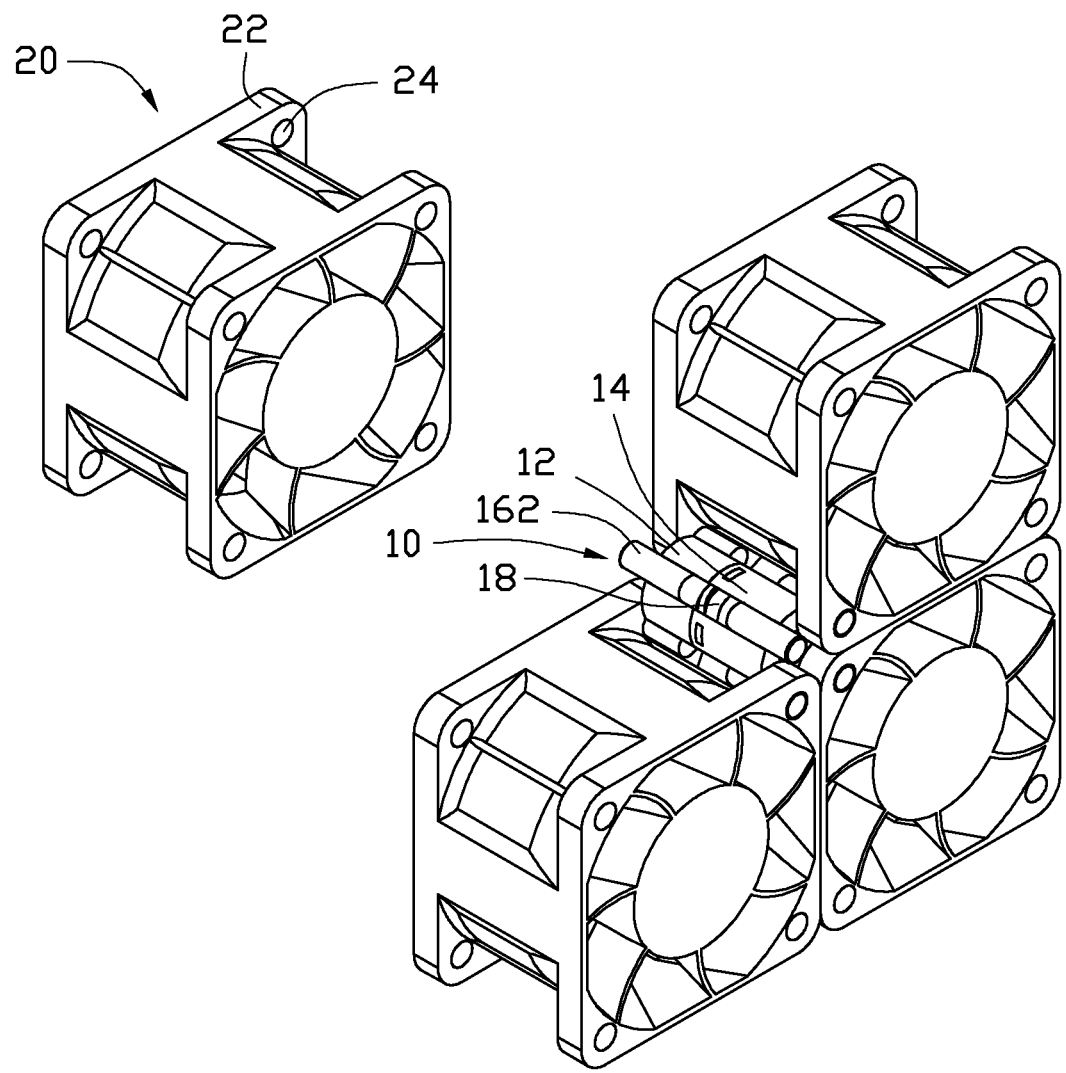
FIG. 2 is a partially exploded, isometric view of the heat dissipation device of FIG. 1; the heat dissipation device includes a fixing member.

Referring to FIGS. 1 and 2, an exemplary embodiment of a heat dissipation device is mounted in a chassis 50. The heat dissipation device includes a fixing member 10 and four fans 20 installed on the fixing member 10.

Each fan 20 includes two spaced boards 22. Each board 22 defines four fixing holes 24 in four corners, respectively.

Figure 3:
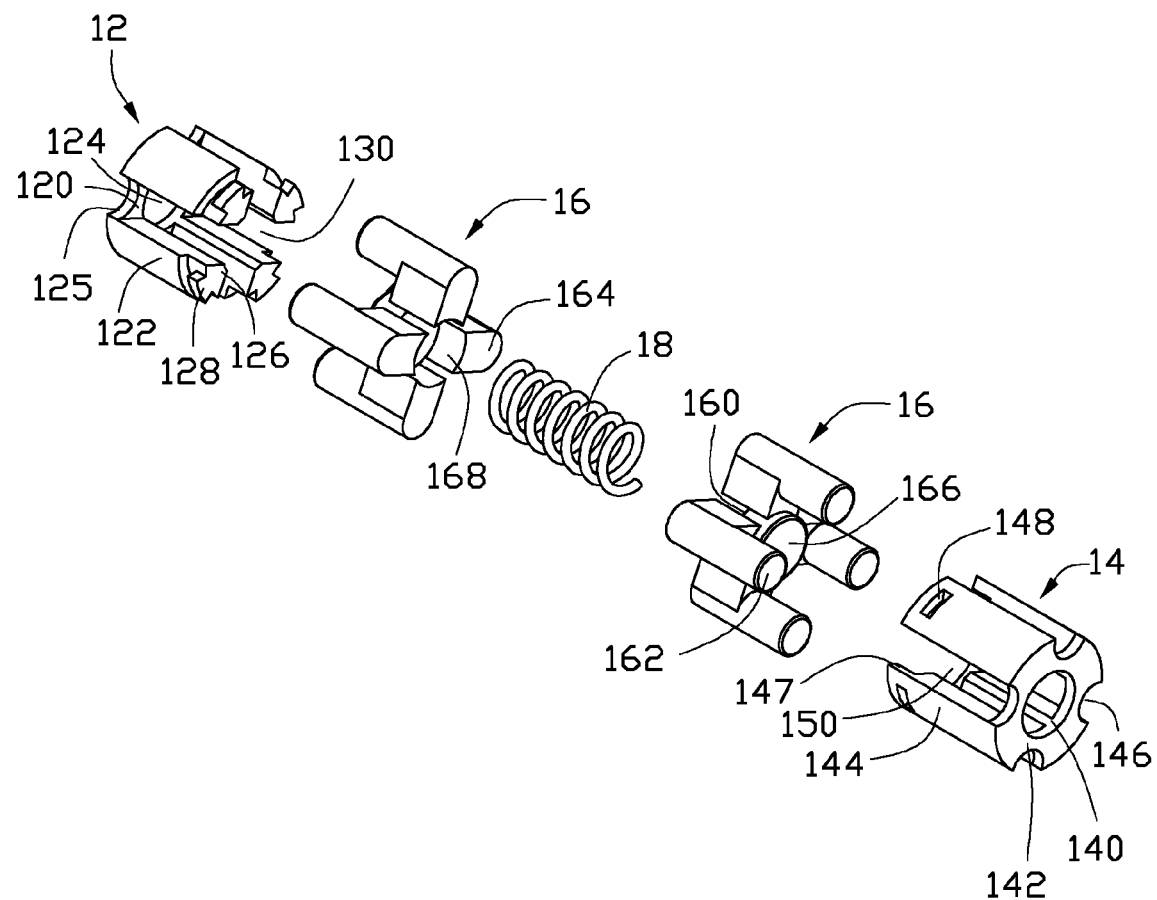
FIG. 3 is an exploded, isometric view of the fixing member of FIG. 2.

Referring to FIG. 3, the fixing member 10 includes a first holder 12, a second holder 14, two engaging portions 16, and a spring 18.

The first holder 12 includes a disc-shaped first plate 120. A round through hole 124 is defined in a center of the first plate 120. Four spaced cutouts 125 are defined on a side of the plate 120. A first pole 122 extends from the side of the first plate 12, between every two adjacent cutouts 125. The first poles 122 and the first plate 120 bind a first receiving space 130. A protrusion 126 protrudes from a distal end of each first pole 122, opposite to the first plate 120. A blocking portion 128 extends from an outer surface of each protrusion 126.

The second holder 14 has a substantially same shape as the first holder 12. The second holder 14 includes a second plate 142 defining a through hole 140 therein. Four spaced cutouts 146 are defined in a side of the second plate 142. A second pole 144 extends from the side of the second plate 142, between every two adjacent cutouts 146. The second poles 144 and the second plate 142 bind a second receiving space 150. A blocking piece 147 defining a slot 148 therein extends from a distal end of each second pole 144.

The first and second holders 12 and 14 can be made of plastic.

Each engaging portion 16 includes a column-shaped base 160. A first end of the base 160 forms an operation portion 166. Four spaced blocks 164 extend from a second end of the circumference of the base 160, away from the operation portion 166. A receiving space 168 is bounded by the blocks 164 and the base 160. A pin 162 extends from each block 164 toward the operation portion 166.

Figure 4:
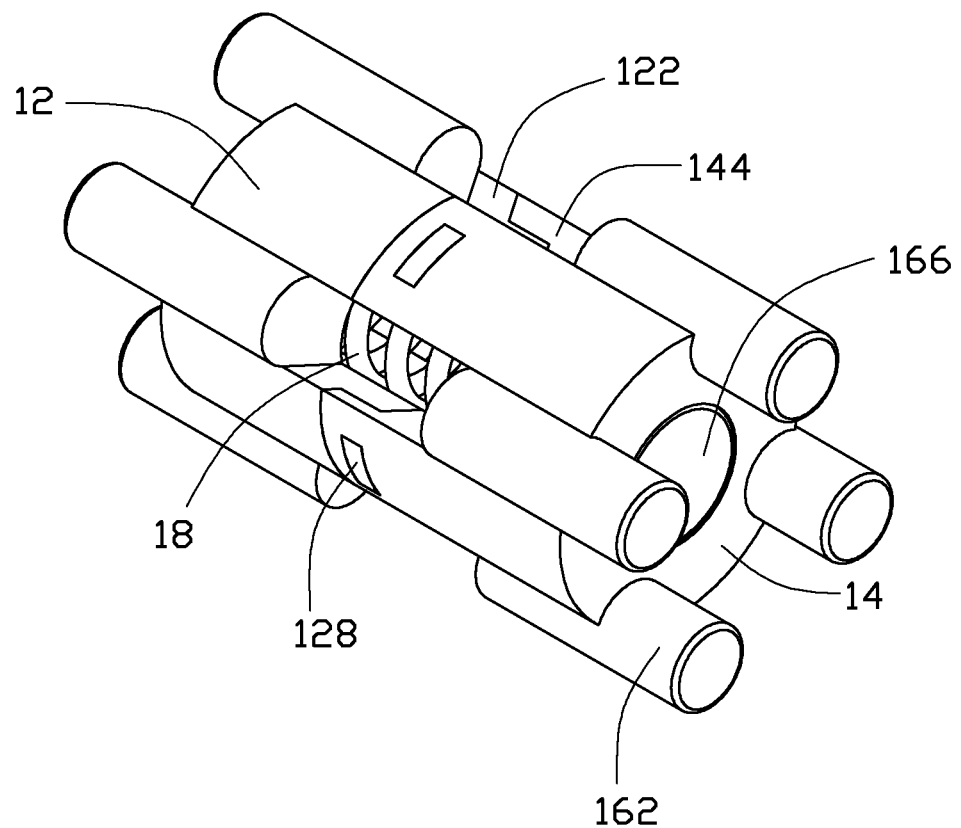
FIG. 4 is an assembled, isometric view of FIG. 3.

Referring to FIG. 4, in assembling the fixing member 10, the pins 162 of one engaging portion 16 extend through the receiving space 130 and the cutouts 125 of the first holder 12, until the blocks 164 of the engaging portion 16 are blocked by the first plate 120. A first end of the spring 18 is received in the receiving space 168 of the engaging portion 16. The other engaging portion 16 is then attached to the spring 18. Thereby, a second end of the spring 18 is received in the receiving space 168 of the engaging portion 16. The second holder 14 is attached to the engaging portion 16. The pins 162 of the engaging portion 16 extend through the receiving space 130 and the corresponding cutouts 146 of the second holder 14, until the blocks 164 of the engaging portion 16 are blocked by the second plate 142. The second holder 14 is moved toward the first holder 12. The second poles 144 of the second holder 14 are deformed away from the spring 18. When the slots 148 of the second holder 14 are aligned with the corresponding blocking portions 128 of the first holder 14, the second poles 144 of the second holder 14 are released. Therefore the blocking portions of the first holder 14 are engaged in the corresponding slots 148 of the second holder 14. At this time, the spring 18 resists the operation portions 166 of the engaging portions 16 to respectively enter the through holes 140 and 124 of the second and first holders 14 and 12.

Figure 5:
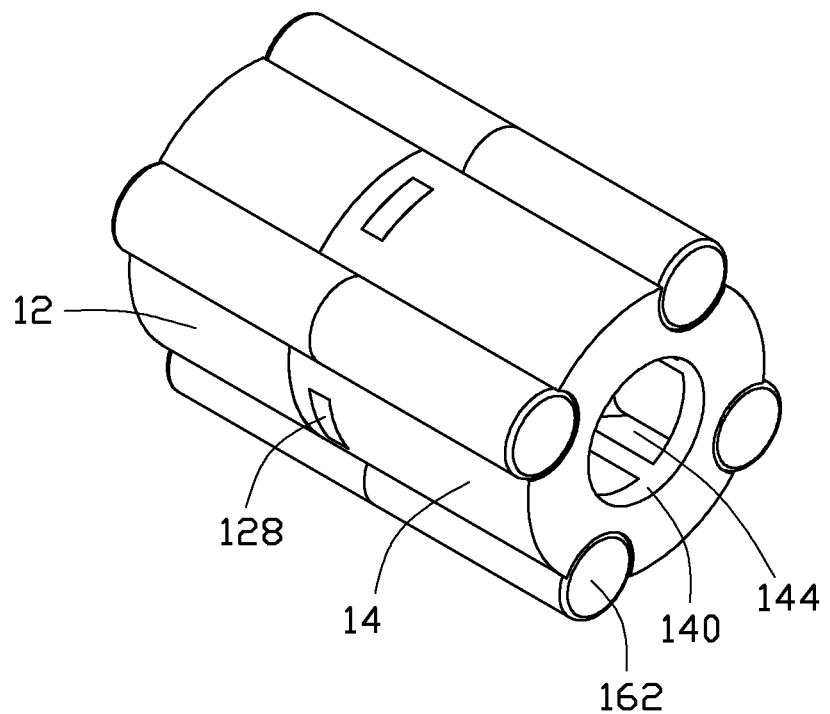
FIG. 5 is similar to FIG. 4, but showing a state of use.

Referring to FIGS. 1, 2 and 5, in assembly, the operation portions 166 of the engaging portions 16 are pressed toward each other to deform the spring 18, until the distal ends of the pins 162 of the engaging portions 16 are completely received in the corresponding cutouts 125 and 146 of the first and second holders 12 and 14. The fixing member 10 is sandwiched between the boards 22 of each of four fans 20 at a corner, with two corresponding pins 162 of the engaging portions 16 aligning with the corresponding through holes 24 of the fan 20. The operation portions 166 are released, and the spring 18 is restored to drive the pins 162 of the engaging portions 16 to enter the corresponding through holes 24 of the fans 20.

A plurality of screws 40 extends through the chassis 50 and engages in the other through holes 24 of the fans 20, to fix the heat dissipation device to the chassis 50.

In disengaging the fans 20, the operation portions 166 of the engaging portions 16 are pressed toward each other, until the pins 162 of the engaging portions 16 disengage from the corresponding through holes 24 of the fans 20.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. A heat dissipation device, comprising:
a plurality of fans each comprising two spaced boards; and
a fixing member sandwiched between the boards of each fan at a corner of the fan, wherein the fixing member comprises two engaging portions movable relative to each other, each engaging portion comprises a plurality of pins engaged in the boards of the fans;

wherein the fixing member further comprises two holders mounted to each other, each of the engaging portions is slidably attached to a corresponding one of the holders.

2. The heat dissipation device of claim 1, wherein the holders are made of plastic.

3. The heat dissipation device of claim 1, wherein each holder comprises a plate and a plurality of poles extending from a side of the plate, a receiving space is bounded by the plate and the poles, a slot is defined in a distal end of each pole of one of the holders, a blocking portion extends from a distal end of each pole of the other holder, for engaging in a corresponding one of the slots.

4. The heat dissipation device of claim 3, wherein each holder defines a cutout therein between every two adjacent poles, the pins of each of the engaging portions extend through the cutouts of a corresponding one of the holders.

5. The heat dissipation device of claim 3, wherein each holder defines a through hole in the plate, each engaging portion comprises a base, a plurality of spaced blocks extend from the circumference of a first end of the base, the pins respectively extend from the blocks toward a second end of the base opposite to the first end, an operation portion is formed at the second end of the base, to extend through the corresponding holder via the through hole.

6. The heat dissipation device of claim 5, wherein the fixing member further comprises a spring mounted between the first ends of the engaging portions.

7. The heat dissipation device of claim 6, wherein a receiving space for receiving the spring is bounded by the first end of each engaging portions and the corresponding blocks.

8. The heat dissipation device of claim 3, wherein a protrusion extends from the distal end of each pole of the holder comprising the blocking portions, the blocking portions respectively extend from the protrusions.

9. The heat dissipation device of claim 8, wherein a blocking piece extends from the distal end of each pole of the holder defining the slots, the slots are respectively defined in the blocking pieces.

10. A fixing member for fixing fans each having two opposite boards, the fixing member comprising:
a first engaging portion comprising a first base, and a plurality of first pins extending from a first end of the first base toward a second end of the first base; and
a second engaging portion comprising a second base, and a plurality of second pins extending from a first end of the second base toward a second end of the second base;
wherein the first end of the first base is attached to the first end of the second base, and a distance between the first ends of the first and second bases is adjustable; the plurality of first and second pins are opposite, one of the first pins and a corresponding one of the second pins are respectively engaged in the boards of each fan from a space between the boards.

11. The fixing member of claim 10, wherein the first base and the second base are both column-shaped, the first pins axially extend from a circumference of the first base, the second pins axially extend from a circumference of the second base.

12. The fixing member of claim 10, wherein the first base and the second base are both column-shaped, a plurality of blocks extend from the circumference of each of the first and second bases, the plurality of first pins extend from the blocks of the first base, the plurality of second pins extend from the blocks of the second base.

13. The fixing member of claim 10, further comprising an elastic member between the first and second engaging portions, to resist the first ends of the first and second engaging portions to move away from each other.

14. The fixing member of claim 10, further comprising two holders to sandwich the assembly of the first and second engaging portions, wherein the first and second engaging portions are slidably between the holders.

15. The fixing member of claim 14, wherein each holder comprises a plate and a plurality of poles substantially perpendicularly extending from a side of the plate, a slot is defined in a distal end of each pole of one of the holders, a blocking portion extends from a distal end of each pole of the other holder, for engaging in a corresponding one of the slots of the holder comprising slots.

16. The fixing member of claim 15, wherein the holders each define a through hole in the corresponding plate, the second ends of the first and second bases of the first and second engaging portions extend through the corresponding through holes of the holders.

17. The fixing member of claim 16, further comprising an elastic member between the first and second engaging portions, wherein the elastic member resists the distance between the first ends of the first and second bases to increase.

* * * * *